United States Patent [19]

Rudling

[11] Patent Number: 5,334,345
[45] Date of Patent: Aug. 2, 1994

[54] ZIRCONIUM-BASED ALLOY FOR COMPONENTS IN NUCLEAR REACTORS

[75] Inventor: Peter Rudling, Västerås, Sweden

[73] Assignee: ABB ATOM AB, Västerås, Sweden

[21] Appl. No.: 961,630

[22] Filed: Oct. 16, 1992

[51] Int. Cl.$^5$ ............................................. C22C 16/00
[52] U.S. Cl. .................................. 420/422; 148/421; 148/672
[58] Field of Search ................. 420/422; 148/421, 672

[56] References Cited

U.S. PATENT DOCUMENTS

| | | | |
|---|---|---|---|
| 3,271,205 | 9/1966 | Winton et al. | 420/422 |
| 4,649,023 | 3/1987 | Sabol et al. | 420/422 |
| 4,810,461 | 3/1989 | Inagaki et al. | 420/422 |
| 4,879,093 | 11/1989 | Garde | 420/422 |
| 4,992,240 | 2/1991 | Komatsu et al. | 420/422 |
| 5,211,774 | 5/1993 | Garde et al. | 148/421 |

OTHER PUBLICATIONS

Eucken et al. in Zirconium in the Nuclear Industry, 8th Intern Symp., ASTM-STP 1023, 1983 p. 113.

*Primary Examiner*—Upendra Roy
*Attorney, Agent, or Firm*—Watson, Cole, Grindle & Watson

[57] ABSTRACT

A zirconium-based alloy for components in nuclear reactors with excellent resistance both to corrosion by water and water steam and to hydrogen absorption under operating conditions consists of 1.0–2.0 per cent by weight tin, 0.07–0.70 per cent by weight iron, 0.05–0.15 per cent by weight chromium, 0.16–0.40 per cent by weight nickel, 0,015–0.30, preferably 0,015–0.20 per cent by weight niobium, 0.002–0.05, preferably 0.015–0.05 per cent by weight silicon, 0.09–0.20, preferably 0.09–0.16 per cent by weight oxygen, the balance being zirconium and impurities, normally occurring in reactor grade sponge zirconium, of other kinds than the above-mentioned substances.

6 Claims, No Drawings

ZIRCONIUM-BASED ALLOY FOR COMPONENTS IN NUCLEAR REACTORS

BACKGROUND OF THE INVENTION

Zirconium-based alloys have been used for a long time in components for nuclear reactors both of the boiling-water type and the pressurized-water type, because of the low absorption cross section of the zirconium for neutrons and their good corrosion resistance to water and water steam under the operating conditions prevailing in the reactor core. The alloys which are most used are zirconium-tin alloys, especially the zirconium-based alloys known under the trade names Zircaloy 2 and Zircaloy 4, the contents of alloying materials of which are within the limits 1.2–1.7 percent by weight for tin, 0.07–0.24 per cent by weight for iron, 0.05–0.15 per cent by weight for chromium, 0–0.08 per cent by weight for nickel, 0.09–0.16 per cent by weight for oxygen, the balance being zirconium and impurities normally occurring in reactor grade sponge zirconium. Zircaloy 2 contains 1.2–1.7 per cent by weight tin, 0.07–0.20 per cent by weight iron, 0.05–0.15 per cent by weight chromium, 0.03–0.08 per cent by weight nickel and 0.09–0.16 per cent by weight oxygen. Zircaloy 4 contains 1.2–1.7 per cent by weight tin, 0.18–0.24 per cent by weight iron, 0.07–0.13 per cent by weight chromium and 0.09–0.16 per cent by weight oxygen. The impurities occurring in reactor grade sponge zirconium consist of the following substances in the contents stated: aluminium 75 ppm or less, boron 0.4 ppm or less, cadmium 0.4 ppm or less, carbon 270 ppm or less, chromium 200 ppm or less, cobalt 20 ppm or less, copper 50 ppm or less, hafnium 100 ppm or less, hydrogen 25 ppm or less, iron 1500 ppm or less, magnesium 20 ppm or less, manganese 50 ppm or less, molybdenum 50 ppm or less, nickel 70 ppm or less, niobium 100 ppm or less, nitrogen 80 ppm or less, oxygen 200–1200 ppm, silicon 120 ppm or less, tin 50 ppm or less, tungsten 100 ppm or less, titanium 50 ppm or less, and uranium 3.5 ppm or less.

Of the above-mentioned alloys, above all Zircaloy 2 has become extensively used because of its good resistance to corrosion by water and water steam. Zircaloy 2 is thus a conventional and well-tested material which fulfills the existing specifications for the applications in questions. Zircaloy 4 does not possess the same good resistance to corrosion by water and water steam as Zircaloy 2 but has a greater resistance to hydrogen absorption during operation of the reactor. Hydrogen absorption leads to embrittlement of the material.

SUMMARY OF THE INVENTION

According to the present invention it has been found possible to achieve a zirconium-based alloy which exhibits a combination of resistance to corrosion by water and water steam and resistance to hydrogen absorption, which is better than in previously known zirconium-based alloys. According to the invention, this result is obtained by causing zirconium-based alloys, which otherwise have the same composition as or a similar composition to Zircaloy 2 or Zircaloy 4, to simultaneously contain higher, definite contents of nickel and niobium and, in certain embodiments, also of silicon and of oxygen.

DESCRIPTION OF THE PREFERRED EMBODIMENTS

More particularly, the present invention relates to a zirconium-based alloy for components in nuclear reactors which is characterized in that it contains 1.0–2.0 per cent by weight tin, 0.07–0.70 per cent by weight iron, 0.05–0.15 per cent by weight chromium, 0.16–0.40 per cent by weight nickel, 0.015–0.30 per cent by weight niobium, 0.002–0.05 per cent by weight silicon, 0.09–0.20 per cent by weight oxygen, the balance being zirconium and impurities, normally occurring in reactor grade sponge zirconium, of other kinds of the above-mentioned substances. The content of silicon preferably amounts to 0.015–0.05 per cent by weight, the content of niobium preferably to 0.015–0.20 per cent by weight, and the content of oxygen preferably 0.09–0.16 per cent by weight.

According to an especially preferred embodiment of the invention, the zirconium-based alloy contains 1.2–1.7 per cent by weight tin, 0.07–0.20 per cent by weight iron, 0.05–0.15 per cent by weight chromium, 0.16–0.40 per cent by weight nickel, 0.015–0.30, preferably 0.015–0.20 per cent by weight niobium, 0.002–0.05, preferably 0.015–0.05 per cent by weight silicon, 0.09–0.20, preferably 0.09–0.16 per cent by weight oxygen, the balance being zirconium and impurities, normally occurring in reactor grade sponge zirconium, of other kinds than the substances mentioned above. This alloy deviates from Zircaloy 2 only in that the nickel, niobium and possibly silicon and oxygen contents are higher.

According to another preferred embodiment of the invention, the zirconium-based alloy contains 1.2–1.7 per cent by weight tin, 0.18–0.24 per cent by weight iron, 0.07–0.13 per cent by weight chromium, 0.16–0.40 per cent by weight nickel, 0.015–0.30, preferably 0.015–0.20 per cent by weight niobium, 0.002–0.05, preferably 0.015–0.05 per cent by weight silicon, 0.09–0.20, preferably 0.09–0.16 per cent by weight oxygen, the balance being zirconium and impurities, normally occurring in reactor grade sponge zirconium, of other kinds than the substances mentioned above. This alloy deviates from Zircaloy 4 only in that the nickel, niobium and possibly silicon and oxygen contents are higher.

The alloys according to the present invention are excellently suited as material in, among other things, cladding tubes for radioactive fuel, as well as for water-filled such cladding tubes, in sheets for channels for fuel assemblies for boiling-water reactors and in spacers between cladding tubes in fuel assemblies. The alloys offer particularly great advantages as material in the spacers, especially because of its good resistance to hydrogen absorption.

The alloys can be manufactured in conventional manner by enclosing the necessary quantities of the alloying materials, while maintaining a vacuum, in a cavity in a briquette of sponge zirconium, which in the form of an electrode is then melted repeatedly in vacuum in an arc furnace before being cast into an ingot. The ingot is then subjected to machining of a conventional kind, such as extrusion, rolling operations and heat treatments for the manufacture of the desired components for nuclear reactors.

The invention will be illustrated more closely by exemplifying compositions of alloys according to the present invention. Such exemplification has been done in the table below. The substances which are not named in the table consist for each one of the alloys of zirconium and of impurities, normally occurring in reactor grade sponge zirconium, of other kinds than the substances stated for the alloys in the table.

|       | Contents in percentage by weight of the respective alloying material | | | | | | |
|-------|---------|-----------|-----------|-----------|------------|-------------|-----------|
|       | Sn      | Fe        | Cr        | Ni        | Nb         | Si          | O         |
| Ex 1  | 1,2–1,7 | 0,07–0,20 | 0,05–0,15 | 0,17–0,40 | 0,015–0,20 | 0,015–0,05  | 0,09–0,16 |
| Ex 2  | 1,2–1,7 | 0,18–0,24 | 0,07–0,13 | 0,17–0,40 | 0,015–0,20 | 0,015–0,05  | 0,09–0,16 |
| Ex 3  | 1,5     | 0,20      | 0,10      | 0,17      | 0,02       | 0,025       | 0,12      |
| Ex 4  | 2,0     | 0,30      | 0,10      | 0,20      | 0,10       | 0,025       | 0,12      |
| Ex 5  | 1,0     | 0,30      | 0,10      | 0,20      | 0,10       | 0,025       | 0,12      |
| Ex 6  | 1,5     | 0,35      | 0,10      | 0,30      | 0,05       | 0,04        | 0,12      |
| Ex 7  | 1,5     | 0,40      | 0,10      | 0,30      | 0,20       | 0,015       | 0,12      |
| Ex 8  | 1,5     | 0,20      | 0,10      | 0,17      | 0,02       | 0,015       | 0,15      |
| Ex 9  | 1,2     | 0,25      | 0,10      | 0,20      | 0,10       | 0,035       | 0,16      |
| Ex 10 | 1,0     | 0,35      | 0,10      | 0,25      | 0,20       | 0,045       | 0,15      |
| Ex 11 | 2,0     | 0,30      | 0,10      | 0,20      | 0,10       | 0,025       | 0,18      |

I claim:

1. A zirconium-based alloy for components in nuclear reactors which comprises 1.0–2.0 per cent by weight tin, 0.07–0.70 per cent by weight iron, 0.05–0.15 per cent by weight chromium, 0.16–0.40 per cent by weight nickel, 0.015–0.30 per cent by weight niobium, 0.002–0.05 per cent by weight silicon, 0.09–0.20 per cent by weight oxygen, and a balance of zirconium and impurities normally occurring in reactor grade sponge zirconium of other kinds than the above-mentioned substances.

2. A zirconium-based alloy for components in nuclear reactors according to claim 1, which comprises 1.2–1.7 per cent by weight tin, 0.07–0.20 per cent by weight iron, 0.05–0.15 per cent by weight chromium, 0.16–0.40 per cent by weight nickel, 0.015–0.30 per cent by weight niobium, 0.002–0.05 per cent by weight silicon, 0.09–0.20 per cent by weight oxygen, and a balance of zirconium and impurities normally occurring in reactor grade sponge zirconium of other kinds than the above-mentioned substances.

3. A zirconium-based alloy for components in nuclear reactors according to claim 1, which comprises 1.2–1.7 per cent by weight tin, 0.18–0.24 per cent by weight iron, 0.07–0.13 per cent by weight chromium, 0.16–0.40 per cent by weight nickel, 0.015–0.30 per cent by weight niobium, 0.002–0.05 per cent by weight silicon, 0.09–0.20 per cent by weight oxygen, and a balance of zirconium and impurities normally occurring in reactor grade sponge zirconium of other kinds than the above-mentioned substances.

4. A zirconium based alloy for components in nuclear reactors according to claim 1, which comprises 0.015–0.05 per cent by weight silicon.

5. A zirconium-based alloy for components in nuclear reactors according to claim 1, which comprises 0.015–0.20 per cent by weight niobium.

6. A zirconium-based alloy for components in nuclear reactors according to claim 1, which comprises 0.09–0.16 per cent by weight oxygen.

* * * * *

UNITED STATES PATENT AND TRADEMARK OFFICE
CERTIFICATE OF CORRECTION

PATENT NO. : 5,334,345
DATED : August 2, 1994
INVENTOR(S) : Peter Rudling

It is certified that error appears in the above-indentified patent and that said Letters Patent is hereby corrected as shown below:

On the title page, Item [30], Foreign Application Priority Data
insert the following:  --October 21, 1991 [SE] Sweden........9103052

Signed and Sealed this

Twenty-seventh Day of September, 1994

Attest:

BRUCE LEHMAN

*Attesting Officer*   *Commissioner of Patents and Trademarks*